(12) United States Patent
Arndt (10) Patent No.: US 6,430,643 B1
(45) Date of Patent: Aug. 6, 2002

(54) METHOD AND SYSTEM FOR ASSIGNING INTERRUPTS AMONG MULTIPLE INTERRUPT PRESENTATION CONTROLLERS

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,438

(22) Filed: Sep. 2, 1999

(51) Int. Cl.[7] .............................................. G06F 13/26
(52) U.S. Cl. ...................................... 710/263; 710/264
(58) Field of Search ................................. 710/260, 261, 710/262, 263, 264, 265, 266, 269, 244, 711

(56) References Cited

U.S. PATENT DOCUMENTS

| | | | | |
|---|---|---|---|---|
| 3,676,861 A | * | 7/1972 | Ruth ........................... | 710/262 |
| 4,268,906 A | * | 5/1981 | Bourke et al. ................. | 710/37 |
| 4,837,677 A | * | 6/1989 | Burrus et al. ................ | 710/308 |
| 5,701,495 A | | 12/1997 | Arndt et al. ................. | 710/263 |
| 5,701,496 A | | 12/1997 | Nizar et al. .................. | 710/266 |
| 5,802,377 A | | 9/1998 | Deshpande .................. | 710/260 |
| 5,892,957 A | * | 4/1999 | Normoyle et al. .......... | 710/260 |
| 5,983,308 A | * | 11/1999 | Kerstein ..................... | 709/224 |
| 6,021,456 A | * | 2/2000 | Herdeg et al. .............. | 710/260 |
| 6,148,361 A | * | 11/2000 | Carpenter et al. .......... | 710/260 |
| 6,279,064 B1 | * | 8/2001 | Bronson et al. ............ | 710/112 |

* cited by examiner

Primary Examiner—Xuan M. Thai
(74) Attorney, Agent, or Firm—Duke W. Yee; Mark E. McBurney; Vincent J. Allen (57) ABSTRACT

An interrupt handling mechanism within a data processing system is used to assign interrupts among multiple interrupt presentation controllers while avoiding the use of a significant amount of signal lines. An interrupt input message from an interrupt source controller is input into an interrupt presentation controller. Fields are added to the interrupt input message to facilitate the assignment of the interrupt input message to an interrupt presentation controller. The input interrupt message is passed between the interrupt presentation controller in a sequential fashion such that the collection of controllers forms a logical ring. On the first circle of the ring, the priority of the processors capable of handling the interrupt is discovered. A second pass through the interrupt presentation controller is used to assign the first processor that is both capable of taking the interrupt and also has an equal or lower priority to that noted on the first pass as to best priority. The condition in which no acceptable processors are found for servicing the interrupt request is provided for by rejecting the interrupt.

21 Claims, 5 Drawing Sheets

METHOD AND SYSTEM FOR ASSIGNING INTERRUPTS AMONG MULTIPLE INTERRUPT PRESENTATION CONTROLLERS

BACKGROUND OF THE INVENTION

1. Technical Field

The present invention relates to a data processing system, and more particularly, to a method of interrupt processing within a data processing system.

2. Description of Related Art

Interrupt handling mechanisms have been developed for dealing more effectively with input/output transactions between a micro-processor and a peripheral device connected to the central processing unit. Basically, whenever the peripheral device requires central processing unit support as part of an input/output operation, it sends an interrupt signal to the processor to notify it that an interrupt condition exists at the peripheral device. Depending on the type of interrupt signal that is received, the processor may elect to either ignore the interrupt and finish what it is doing, or it can handle the interrupt when it receives it. Once the interrupt signal is handled by the interrupt handling mechanism, the processor returns to the state it was before the interrupt took place. An interrupt source may be a keyboard, an adapter card, or any other device connected to the processor.

The processing of an interrupt request typically involves the processor interrogating the source of the interrupt, performing specific functions based upon the type of the interrupt, or even resetting or turning off the interrupt request. There are several different types of interrupt requests. For example, when an interrupt request is deferred by the processor, it is said to be a masked request. An interrupt request may also be prioritized by a particular system if the request from one device is more urgent than the request from another device. Thus, the request from one device will have priority over the request of the other device. The priority of an interrupt request is predefined by the system. When an interrupt request has been accepted by the processor, a subsequent interrupt request cannot interrupt the current interrupt unless it has priority over the current interrupt. If it does not have priority, then the subsequent request must wait until the current request is handled.

As systems become more complex with more numerous peripheral devices, the numerous interrupt requests generated by these devices slows the processor down. Therefore, interrupt controllers were developed to delegate certain interrupt functions from the processor to the interrupt controller. Such interrupt controllers allow the processor to continue working without servicing an interrupt at the time that it is first made. The interrupt controller is used to monitor multiple interrupt sources while only interrupting the processor using a single interrupt line.

Such interrupt controllers were initially developed primarily for a single processor system which had few interrupt sources or priority levels. As technology developed, multi-processor systems came into existence. Generally, in a multiprocessor system, more than one of the processors are capable of performing a particular interrupt request. However, in order to allow all of the processors that are capable of performing such a request to do so, an interrupt signal from each interrupt source would have to be wired to each processor or interrupt controller that is capable of servicing such an interrupt. This leads to increases in bus complexity because of the number of interrupt signals that have to be hard-wired to each processor.

To satisfy the needs of multi-processing data systems such as these, dedicated interrupt controllers were provided for each processor in the system. However, that approach was very costly and did not allow for effective management of the interrupts as the number of interrupts sources and priority levels increased. Scalable interrupt sub-systems were developed to solve such growing pains.

Arndt, et al. (U.S. Pat. No. 5,701,495) disclosed a scalable system interrupt structure for multi-processing systems and is hereby incorporated by reference. The interrupt sub-system provides for queuing of interrupts from many sources and presenting interrupts to the best processor in a multiprocessor system. This is accomplished by separating the internal interrupt mechanism into two layers: an interrupt routing layer and an interrupt presentation layer. The interrupt routing layer routes the interrupt conditions to the appropriate instance of an interrupt management area within the interrupt presentation layer. The interrupt presentation layer communicates the interrupt source to the system software which is to service or process the interrupt. By providing two layers within the interrupt sub-system, application or system software can be written which is independent from the types or sources of interrupts. The interrupt routing layer hides the details of a particular hardware implementation from the software. The interrupt presentation layer interfaces to the system and/or application software and provides hardware independent functionality. Interrupt lines from various interrupt sources are input into an interrupt source controller. The interrupt source controller is connected to a system interconnect fabric, such as a bus, which is also connected to the interrupt presentation controllers.

Interrupt presentation controllers are used to present interrupts to the system's processors. Each processor has associated with it a memory mapped interrupt management area. Some implementations distribute the interrupt presentation layer by placing the interrupt management areas for some of the platform processors in one chip, and the interrupt management areas of the rest of the processors in other chips.

The reason for placing the interrupt management area on different chips is that as symmetrical multiprocessor computer systems grow larger, it is impractical to integrate the interrupt presentation controller for all of the system's processors into a single chip. However, when the interrupt management areas are implemented on different chips, interrupt messages may have to be forwarded between implementing chips if no accepting processor can be found in the original presentation layer chip.

Furthermore, if priority-based assignment is implemented, then the priority of the least favorite processor may have to be broadcast to the other presentation layer chips.

Methods for allowing for the proper assignment of interrupt to multiple interrupt presentation controllers are currently very complex and/or require a significant amount of specialized signal wires between the multiple controllers. Hence, there is a need for a method of distribution of interrupts to multiple interrupt presentation controllers which is less complex and does not require a significant amount of specialized signal wires.

SUMMARY OF THE INVENTION

The present invention provides a simple method for distributing interrupts to multiple interrupt presentation controllers and avoids the use of a significant amount of signal lines previously required in multiprocessor systems. An input interrupt message from the interrupt source controller contains a service queue number, an interrupt priority, and an interrupt source number. This input interrupt message is input into an interrupt presentation controller and the following fields are added to the input interrupt message: interrupt presentation controller number, search priority, and best priority. Once this is done, the input interrupt message is passed between the interrupt presentation controllers in a sequential fashion such that the collection of controllers forms a logical ring.

A new interrupt message on its first circle of the ring discovers the priority of processors capable of handling the interrupt. The least favorite level that exists on each processor is retained in the best priority field of the input interrupt message. If a subsequent interrupt presentation controller has a less favored level than what has already been retained, then that value is placed in the best priority field. The input interrupt message then makes a second pass through the interrupt presentation controllers.

On the subsequent pass, the input interrupt message is assigned to the first processor that is both capable of taking the interrupt and also has an equal or lower priority to that noted on the first pass as the best priority.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The following terms will be used throughout the description to describe the preferred embodiment of the invention:
Available Processor Register (APR):
   Optional register to be used by the interrupt routing layer hardware to know which processors are available for a particular server in order to route interrupts. The APR(s) are intended to be used with global queues.
Best Controller Priority:
   The best priority of those processors assigned to a given interrupt presentation controller.
Best Priority:
   The priority level of the most eligible interrupt server (processor) of all of the IPCs that have been searched, i.e. the priority level of the server having the Least Favored Level.

Current Interrupt Presentation Controller Number (CIPC#):
   Set at system initialization time to identify each controller, used to identify the IPC that is currently being searched.
External Interrupt Request Register (XIRR):
   One per processor and provides a single source identifier to the system software for interrupts.
   Consists of two registers:
   Current Processor Priority Register (CPPR).
      This register is updated by the software to contain the current processor priority. This register is updated, when the software issues a Load instruction to the XIRR at a certain address, to the priority of the interrupt represented by the XISR data which is delivered by the executed Load instruction.
   External Interrupt Source Register (XISR).
   Indicates the source of a pending interrupt (or a value of 0, if no pending interrupt).
External Interrupt Vector Register (XIVR):
   One per interrupt level in each interrupt source controller. Used to prioritize each interrupt level. Can be used to vector particular interrupts to particular servers.
Global Queued Interrupt Request Register (G_QIRR):
   This register may be written as a single byte or as four bytes (a 32 bit word). Used in Symmetric multiprocessor (SMP) systems as a non-processor specific server queue.
   Consists of two registers:
   Global Most Favored Request Register:
      (G_MFRR), which is an MFRR (defined below).
   Interrupt Source Specification Register (ISSR).
      Used in SMP systems to configure the source specification of a G_MFRR interrupt (see XISR).
Interrupt Presentation Controller (IPC):
   A controller used to manage the presentation of interrupts to N processors, where N is a power of 2.
Interrupt Source Number (SRC#):
   A part of the input interrupt message which identifies both the interrupt source controller as well as the particular source of an interrupt request.
Least Favored Level:
   Represents the priority level of the interrupt request with the lowest priority. In the preferred embodiment, it is represented by the hexadecimal value "xff."
Least Favored Level Selector (LFLS):
   A set of logic which outputs the CPPR value and processor number of the processor with the least favored priority level from among those allowed to participate in the selection process by the selection mask. If no CPPR is allowed to participate due to the selection mask, the output is the most favored priority value (x00).
Most Favored Level:
   Represents the priority level of the interrupt request with the highest priority. In the preferred embodiment, it is represented by the hexadecimal value "x00."
Next Interrupt Presentation Controller Number (NIPC#):
   Set within each IPC at system initialization time to identify the next controller in the set of IPCs such that each IPC contains a NIPC# that points to the next IPC in a logical ring of IPCs.
Queue Mask Array (QMA):
   One entry for each supported global queue. Each entry has one bit for each supported processor. These entries are managed by initialization and operation management software.

Queued Interrupt Request Register (QIRR):
This register may be written as a single byte or as four bytes (a 32 bit word); at least one per processor plus one per non-processor specific server queue.
Consists of two registers:
Most Favored Request Register (MFRR).
Holds the priority of the most favored request on the queue. This register can be read back by the software to verify that the write has taken place.
Interrupt Source Specification Register (ISSR) (defined above).
Search Priority:
The most favored priority level used to search for an eligible interrupt server; an interrupt server must be at no more favored level to be eligible.

While the preferred embodiment is described using the language and constructs of the Power PC, one skilled in the art will recognize that the invention is not limited to the particular definitions and architecture of the Power PC but may be implemented on any multiprocessor system and may be modified to reflect the architecture of the particular platform used.

Figure 1:
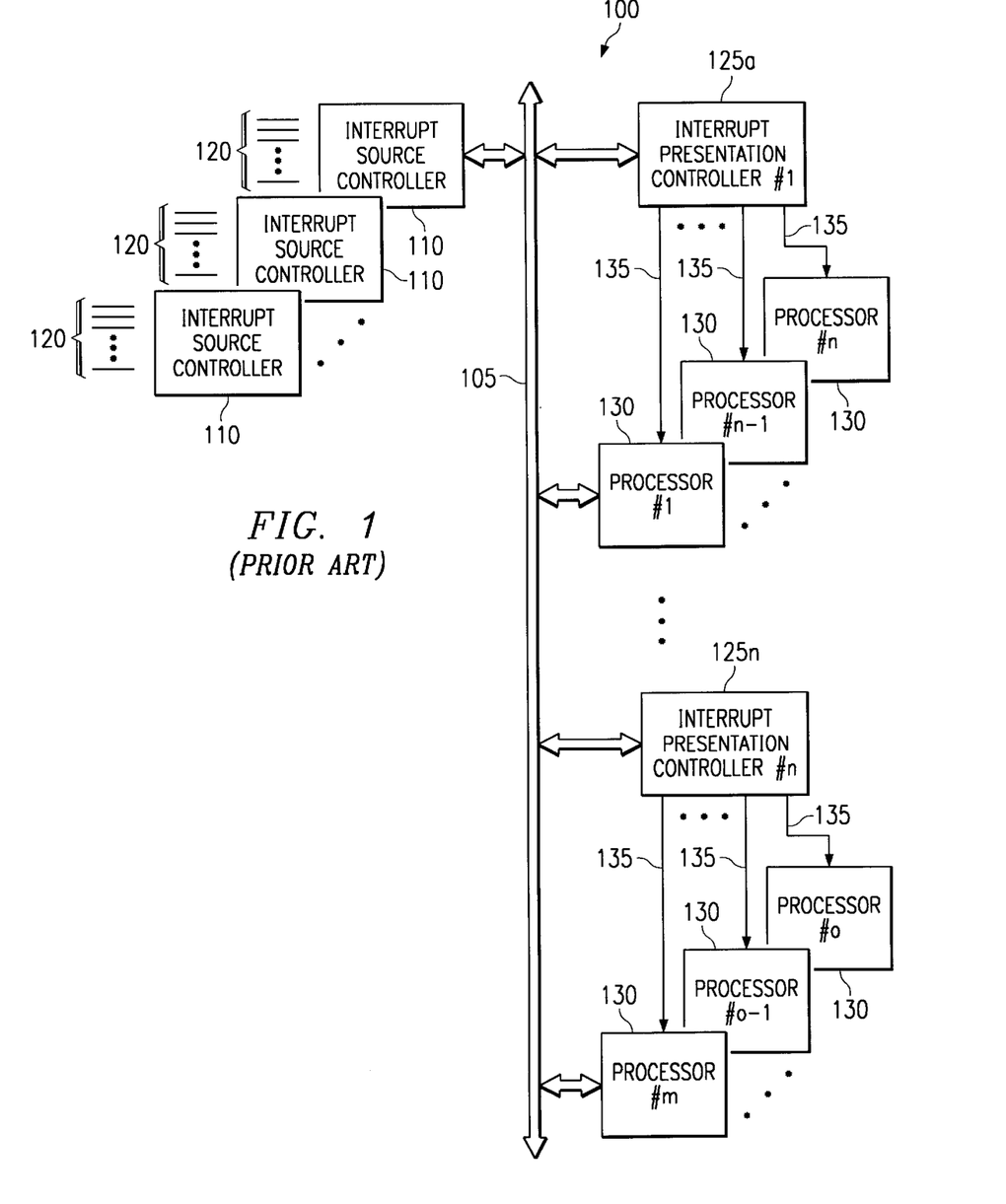
FIG. 1 is a block diagram that depicts a logical view of a data processing system.

With reference now to FIG. 1, a block diagram depicts a logical view of a data processing system 100. The system interconnect 105 allows for the transfer of data among the various components of the system. The interrupt source controllers 110 are connected to the system interconnect 105. The system interconnect 105 could be any interconnect fabric such as a bus or a switch. In the preferred embodiment, the system interconnect 105 is a system bus. Interrupt lines 120 from various interrupt sources are input into the interrupt source controllers 110. The interrupt presentation controllers 125 are also connected to the system interconnect 105. In addition, multiple processors 130 are connected to the system interconnect 105. The interrupt presentation controllers 125 control the interrupt lines 135 to multiple processors 130. Other methods of connecting the various components may be used without departing from the scope of the claimed invention.

Each processor 130 has associated with it a memory mapped interrupt management area which contains the external interrupt request register (XIRR). The XIRR is a 4 byte facility and is composed of two fields: the current processor priority register (CPPR), and the external interrupt source register (XISR).

The CPPR contains the processor's operating priority. The CPPR may be written by software to prevent interruptions from less favored priority requests. An interrupt should be routed to a processor only if the processor's CPPR field is less favored than the priority of the interrupt request. Software stores an interrupt level value to the CPPR as a 1 byte register to inform the interrupt hardware of the current operating priority of the processor. The CPPR reflects the operating priority of the processor, not the priority of the interrupt (if any) associated with the value of the XISR. Implementations will need memory elements to store the priority of a pending interrupt, but these storage elements are not an externally visible part of the architecture.

To determine the source of the interrupt, the software reads the XISR by issuing a load instruction to the XIRR. The value in the XISR specifies the source of the interrupt. For interrupts from an interrupt source controller, the upper 4 bits of the XISR indicate the interrupt source controller which presented the input interrupt message, and the lower order 4 bits of the XISR field define the particular source of the interrupt message.

Those implementations that distribute the interrupt presentation layer by placing the interrupt management areas for some of the platform processors in one chip and the interrupt management areas for the rest of the processors in other chips may place implementation specific requirements on the interrupt routing hardware to implement the group server queues.

Figure 2:
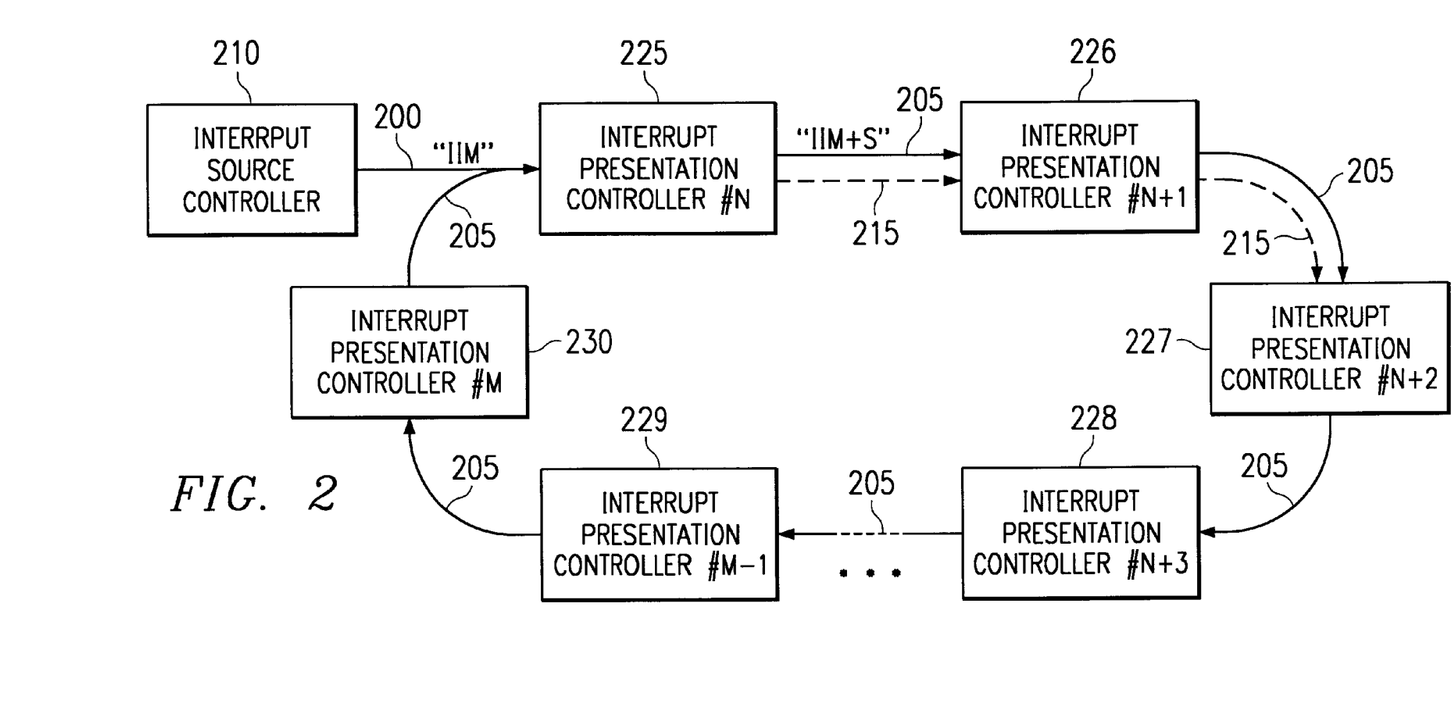
FIG. 2 is a flow chart that depicts the logical path that an input interrupt message might take in a preferred embodiment of the invention.

With reference now to FIG. 2, a flow chart depicts the logical path that an input interrupt message might take in a preferred embodiment of the invention. Input interrupt message (IIM) 200 is input from the ISC 210 into one of the interrupt presentation controllers 225. FIG. 2 shows IIM 200 being first input into the interrupt presentation controller 225. Interrupt presentation controller (IPC) 225 adds additional fields "S" to the IIM to make message "IIM+S" 205. The fields "S" that are added are the Interrupt Presentation Controller number, which in this case would be "N", the Search Priority, and the Best Priority. The Search Priority is initialized to the least favored level and the Best Priority is initialized to the most favored level. The IIM+S is then forwarded to the compare section of IPC N 225. The compare section of IPC N 225 compares the Best Controller Priority (BCP) available on that particular IPC to service the IIM. The BCP for a particular IPC is the priority of the processor associated with the IPC that is operating at the least favored level. If the BCP is better than, i.e. less favored, than the Best Priority that is recorded in IIM+S 205, then the BCP is written over the Best Priority of IIM 205. Then IIM+S 205 is forwarded to the compare section of IPC N+1 226 where the same procedure is followed as in the compare section of IPC N 225. The same procedure applies for IPC N+2 227, IPC N+3 228, throughout the loop to IPC M 230.

Once the loop is completed, then IIM+S 215 with the newly recorded Best Priority is passed around the loop for a second time, starting with IPC N 225. The Search Priority is set to the value of the Best Priority that was found on the first pass through the loop and Best Priority is initialized back to the most favored level. The Priority field in IIM+S 215 is compared to the Search Priority field. If the Search Priority is more favored than the Priority of IIM+S 215, then the interrupt is rejected because there is no processor capable of serving IIM 200 since all are operating at more favored priority levels. However, if the Search Priority is less favored than the Priority of the IIM, then there is a processor that is capable of serving IIM 200.

Starting at initial IPC 225, the Search Priority is compared to the current Best Controller Priority (BCP) of IPC 225. If the BCP is less favored or equal to the Search Priority, then IIM 200 is assigned to the processor associated with IPC 225 that is operating at the least favored level, i.e., the one with the BCP. If the BCP of IPC 225 is more favored than the Best Priority, then the Best Priority (found on the second pass) is set to the BCP of IPC 225 and IIM+S 215 is forwarded to next IPC 226 in the loop and the comparison process is repeated for IPC 226.

As shown in FIG. 2, the BCP at IPC 226 is more favored than the Search Priority. Hence, the Best Priority is reset to. the BCP at IPC 226 if it is less favored than the BCP found at IPC 225. IIM+S 215 is again forwarded to next IPC 227 and the comparison process is repeated. This continues until IIM 215 is assigned to a processor or is rejected. FIG. 2 illustrates the case where one complete loop is made and then IIM 200 is assigned to a processor by IPC 227. This is because the Search Priority is at a more favored level or equal to the BCP found at IPC 227.

Note that IPC 227 may or may not be the IPC at which the Best Priority was initially found on the first pass 205 through the loop. It is also possible that on the second pass 215, the IIM 200 may not get assigned to a processor. This would represent the case in which during the time that the Search Priority was being found on the first pass or during the first part of the second pass, previous interrupt requests were assigned to one or more processors such that all of the processors are operating at a level that is more favored than the Search Priority when the processor's BCP is compared to the Search Priority on the second pass. When an IPC is found with a BCP that is less favored than the Search Priority, IPC N+2 227 stops the forwarding of IIM 205 around the loop and interrupts the serving processor with the BCP.

Figure 3A:
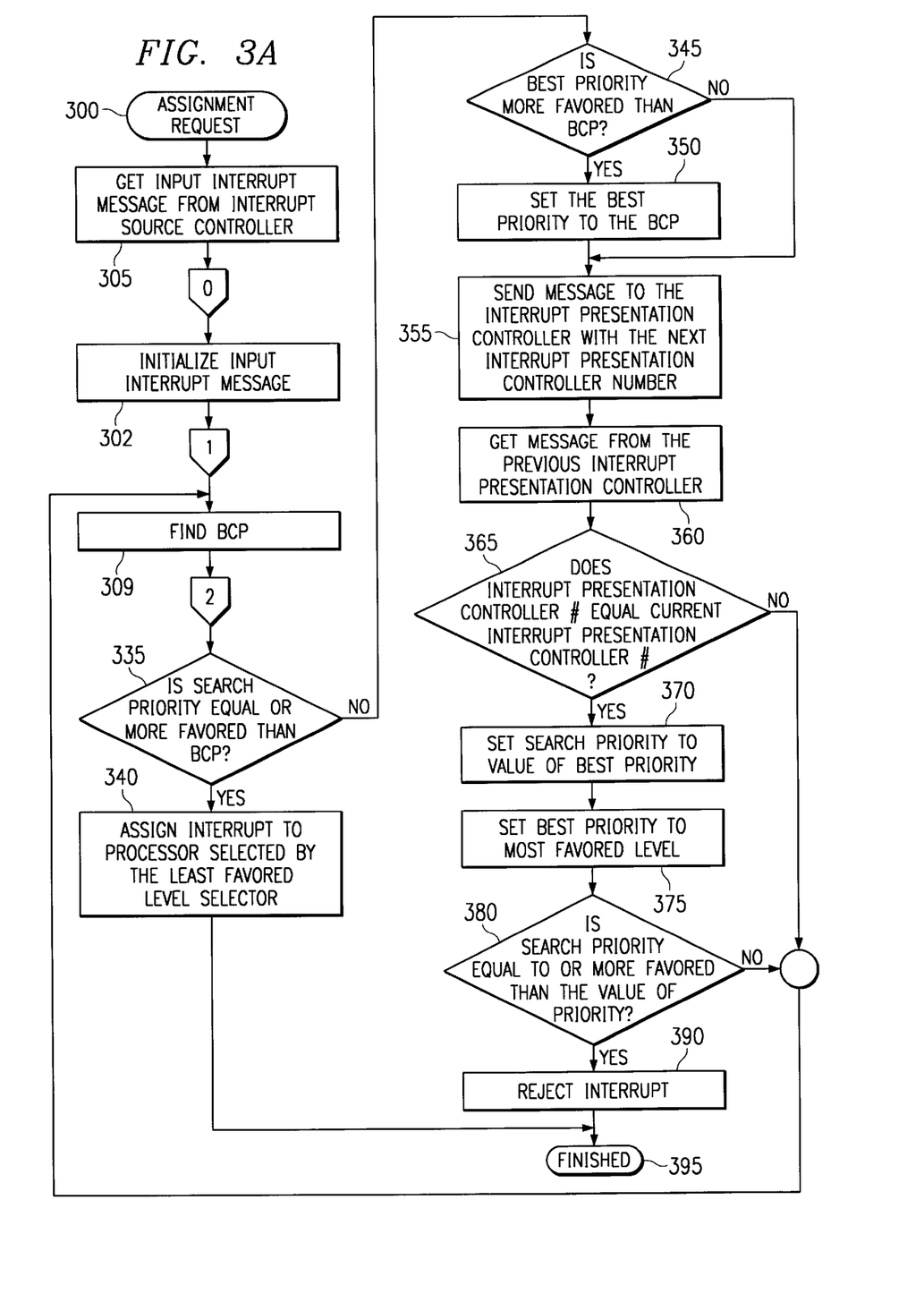
FIG. 3A is a flow chart of the overall flow of the assignment of interrupts among multiple interrupt presentation controllers.

With reference now to FIG. 3A, a flow chart illustrates the method of the present invention for assigning interrupts among multiple interrupt presentation controllers. When an interrupt source controller has a request that an interrupt be assigned to an interrupt presentation controller at step 300, the input interrupt message is obtained from the interrupt source controller and presented to an interrupt presentation controller at step 305. The input interrupt message is initialized at step 302.

The Best Controller Priority for the interrupt presentation controller is found at step 309. The Search Priority is compared to the best controller priority at step 335. If the Search Priority is more favored or equal to the best controller priority, then at step 340 the interrupt is assigned to the processor selected by the least favored level selector. Step 340 marks the end of the assignment of the interrupt at step 395. However, if the search priority is less favored than the best controller priority at step 335, then that means that either the process is on the first loop through the interrupt presentation controllers or the current IPC is not the best one for serving the interrupt. In such a case, the Best Priority is updated to the BCP at that IPC but only if the BCP is less favored than the Best Priority. Next, the input interrupt message is sent to the interrupt presentation controller with the next interrupt presentation controller number at step 355. The next interrupt presentation controller gets the message from the previous interrupt presentation controller at step 360. The interrupt presentation controller number is compared to the current interrupt presentation controller number at step 365 to see if this is the initial IPC indicating that one loop has been made. If not, then the BCP selection process is repeated starting at step 309. If it is the initial IPC in the loop, then the search priority is set to the value of the best priority at step 370. The best priority is then set to the most favored level at step 375 which in the preferred embodiment is Off. If the search priority is equal to or more favored than the value of the interrupt priority contained within the input interrupt message at step 380, then the interrupt is rejected at step 390 and the process is finished at step 395. This means that there is no available processor to serve that interrupt. However, if the search priority is equal or more favored than the value of the priority contained in the input interrupt message, then the BCP Selection process is repeated starting at step 309. The above process is repeated until the interrupt is either assigned to a processor at step 340 or the interrupt is rejected at step 390.

Figure 3B:
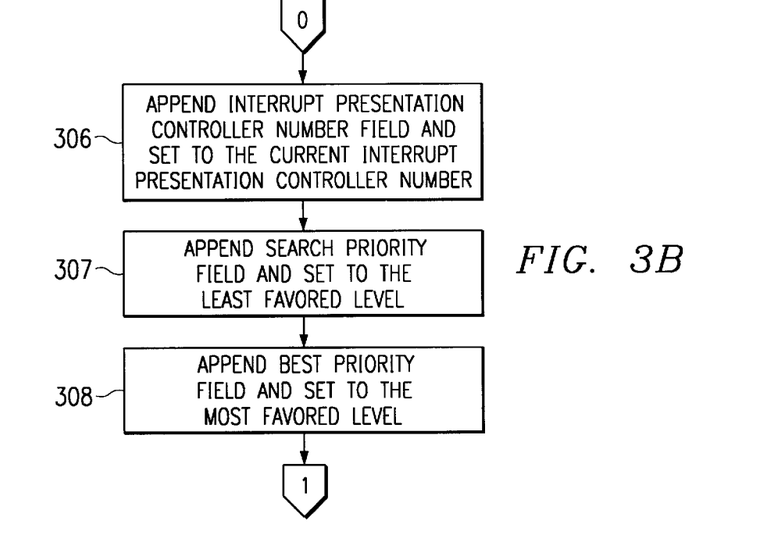
FIG. 3B is a flowchart that shows the method for initalizing the Input Interrupt Message.

Referring now to FIG. 3B, a flowchart shows the method for initializing the Input Interrupt Message. The interrupt presentation controller appends the interrupt presentation controller number field and sets it to the current interrupt presentation controller number at step 306. At step 307, the search priority field is appended to the input interrupt message and set to the least favored level. The best priority field is also appended to the input interrupt message and is set to the most favored level at step 308. This concludes the initialization stage of the process.

Figure 3C:
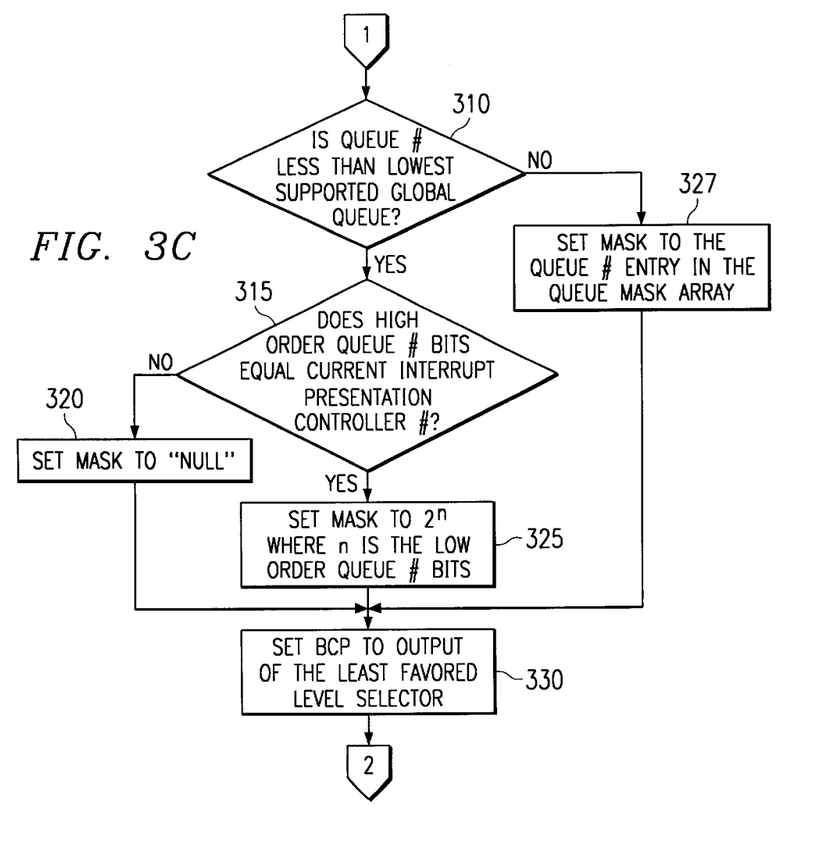
FIG. 3C is a flowchart that shows the method used to find the Best Controller Priority.

Referring now to FIG. 3C, a flowchart of the method used to find the Best Controller Priority is shown. The first step is to generate a mask based upon the queue number contained within the input interrupt message. The queue number field of the input interrupt message is used in the mask generation to mask processors that are not capable of serving this particular interrupt request.

The logical view of the system is that of N queues of events, each queue associated with a logical server. Within each queue there exists a prioritized list of events. In the single processor system, there is one server and therefore one queue. In a multiprocessor system, there would be one queue associated with each processor and at least one global queue associated with the collection of processors viewed as one logical server.

Associated with each queue of the preferred embodiment is a server number in the range of 0x00 through 0xff. The individual processors within the system are assigned server numbers ascending from 0x00 and global queues which serve multiple processors are assigned server numbers descending from 0xff. Each interrupt presentation controller handles interrupts for some number of the platform's processors. For example, IPC #0 handles 00 to 0f, IPC #1 handles processors 10 to 1f, etc. Queue lengths are implementation dependent, but have a minimum depth of 1.

For a multiprocessor system, the available processor mask (APM) identifies which processors are available to service events in the global queue. A system with a richer hierarchy might group subsets of processors into server groups and associate with each group a queue common to the group.

Referring again to FIG. 3C, the mask generation is described in more detail. In this example, the 8 bit queue numbers are assigned such that x0f0 to x0ff are global queues (numbered x00 through x0f), while queue numbers x00 through x0EF are per processor queues with each group of 16 processors and their associated global queues being handled by a separate IPC (numbered x00 through x0E). Those familiar in the art, will recognize that other size queue numbers with other assignment mappings are possible within the framework of this invention. If the higher order bits of the queue number are equal to 1111 at 310, then the mask for this particular interrupt is acquired from a queue mask array. A queue mask array is simply an array of APRs, that is, masks to be used to select certain processors in a group of processors for a particular type of interrupt.

If the higher order bits of the queue number are not 1111 at step 310, then the higher order bits are compared to the current interrupt presentation controller number (CIPC#) at step 315. If the higher order bits of the queue number are equal to the CIPC#, then the CIPC is the one that handles this range of interrupts. Thus, a mask $2^N$ is generated where n is the lower order 4 bits of the queue number. This gives back a number with only one bit high representing the processor that may serve the interrupt. If the CIPC# is not equal to the higher order bits at step 315, and the higher order bits are not "1111," then a null mask is generated in order to indicate that this interrupt presentation controller is not suitable for serving this particular input interrupt message. The message will be forwarded to the next interrupt presentation controller. Each IPC in the loop does the above in sequence.

Therefore, the effect is that while each IPC only implements a mask that is 16 bits wide and implements a least favored level selector (LFLS) that compares the 16 current processor levels, the summation of N IPCs in the loop is one effective IPC that appears to have a mask that is N×16 bits wide and a LFLS that compares N×16 current processor priority levels.

Once a mask is generated, then the least favored level selector is used at step 330 to find the Best Controller Priority (BCP). The least favored level selector (LFLS) is a set of logic which outputs the current processor priority register (CPPR) with the least favored priority level from among those allowed to participate in the selection process by the selection mask. If there is no processor that is allowed to participate, then the output of the least favored level selector is the most favored priority value which in the preferred embodiment is x00. This indicates that the interrupt will not be serviced by this particular IPC because of the mask generated.

Figure 4:
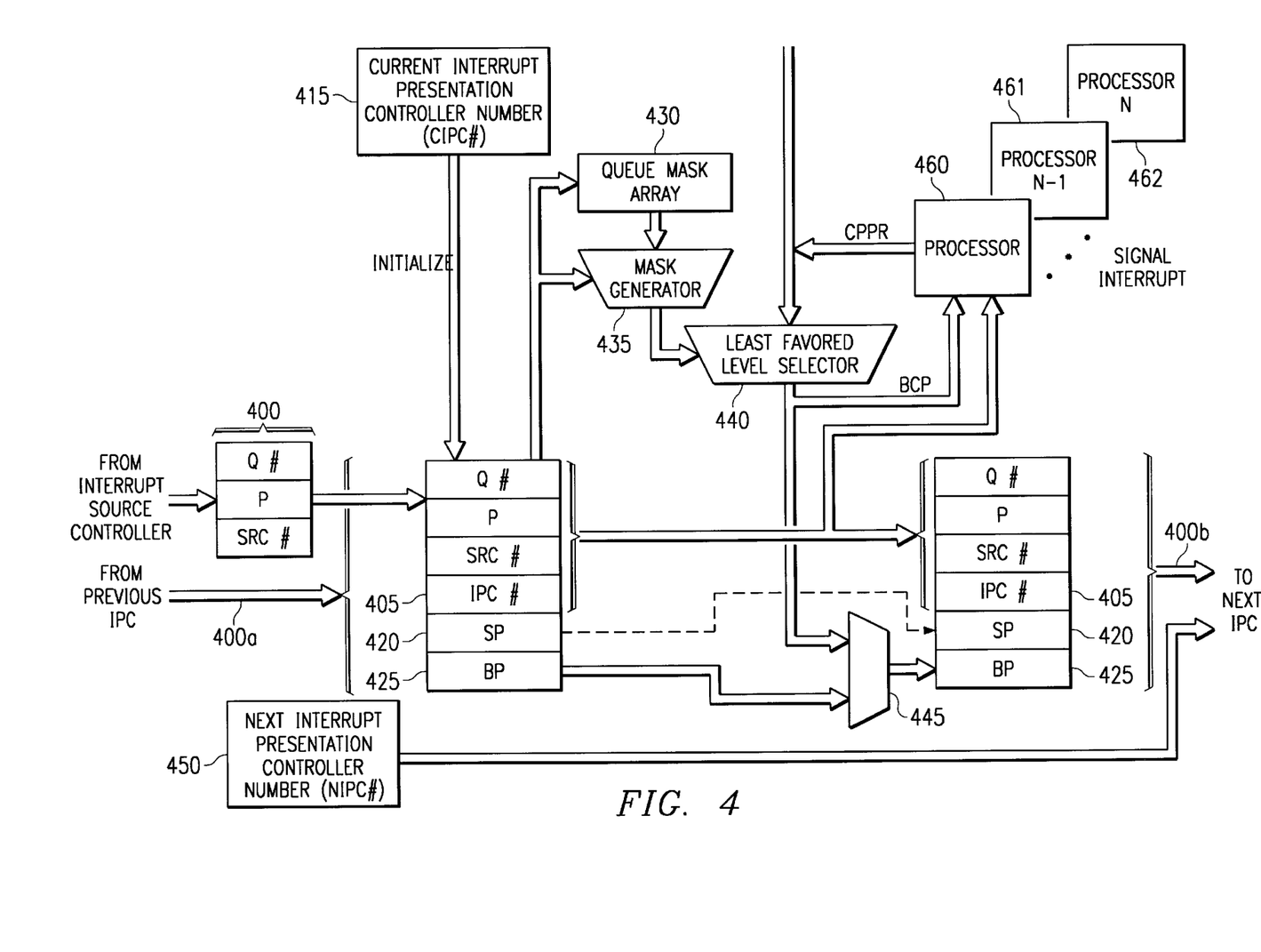
FIG. 4 is a block diagram that depicts the interrupt presentation controller of the present invention.

With reference now to FIG. 4, a block diagram depicts the interrupt presentation controller of the present invention. The input interrupt message 400 is initially input from the interrupt source controller into the interrupt presentation controller. Upon the initial presentation to an interrupt presentation controller, the IPC number 405 is appended to the new input interrupt message 400 and is initialized with the current interrupt presentation controller number 415 to mark the first IPC in the loop. The search priority 420 and the best priority 425 are initialized to the least favored level (0xff) and the most favored level (0x00), respectively, upon the initial presentation of the input interrupt message 400 from the interrupt source controller to the interrupt presentation controller.

Once the input interrupt message from the interrupt source controller is appended with the IPC Number 405, Search Priority 420 and Best Priority 425 or upon receipt of the input interrupt message 400a from a previous interrupt presentation controller, the input interrupt message 400a is input into the queue mask array 430 and the mask generator 435. Using the output from the queue mask array 430 and the input interrupt message 400a, the mask generator 435 generates a mask that is input into the least favored level selector 440. The least favored level selector 440 outputs the least favored level of all the processors available to service the interrupt by using the mask generator output and the CPPR value from the processors 460, 461, 462. The LFLS 440 ignores the CPPR of the processors that are not available to service the interrupt. The output of the least favored level selector is saved into the Best Controller Priority (BCP) and is compared with the best priority field 425. If the best priority 425 is more favored than the BCP, then the best priority 425 is set to the value of best controller priority. The interrupt presentation controller sends the newly revised input interrupt message 400b to the next interrupt presentation controller. The interrupt presentation controller determines the next interrupt presentation controller to send the input interrupt message by looking at the next interrupt presentation controller number 450. This number is set during system initialization in each interrupt presentation controller such that the next interrupt presentation controller number and the current interrupt presentation controller number in each of the interrupt presentation controllers forms a logical loop.

What is claimed is:

1. A multi-processor system comprising:
    (a) a system interconnect fabric;
    (b) a plurality of processors;
    (c) a plurality of interrupt source controllers connected to the system interconnect fabric;
    (d) one or more interrupt sources connected to one or more of the plurality of interrupt source controllers;
    (e) a plurality of interrupt presentation controllers connected to the system interconnect fabric each having a one or more interrupt lines connected to one or more of the plurality of processors, wherein the plurality of interrupt presentation controllers form a logical loop such that the loop may be traversed to find the interrupt presentation controller with the best controller priority for servicing an interrupt request.

2. The multiprocessor system of claim 1 further comprising:
    (f) An input interrupt message wherein the input interrupt message is passed along the loop of interrupt presentation controllers when the loop is traversed.

3. The multiprocessor system of claim 2 wherein the input interrupt message comprises:
    (a) a queue number;
    (b) an interrupt priority;
    (c) a source number;
    (d) a search priority; and
    (e) a best priority.

4. A method for assigning interrupts among multiple interrupt presentation controllers, the method comprising the steps of:
    (a) presenting a query to each of the plurality of interrupt presentation controllers in a predefined logical sequence such that a best controller priority is recorded;
    (b) searching in the predefined logical sequence for a server with priority at least as good as the best server priority recorded; and
    (c) interrupting the server with priority at least as good as the best priority recorded.

5. The method of claim 4 further comprising the step:
    (d) rejecting an interrupt request with a priority lower than the best server priority recorded.

6. The method of claim 4 further comprising the step:
    (d) recording a new best server priority while performing said step of searching for a server.

7. The method of claim 4 wherein the step of presenting a query comprises the steps:
    (a) inputting an input interrupt message from a source controller into an interrupt presentation controller;
    (b) appending a field to the input interrupt message;
    (c) finding a controller operating at a least favored priority for each interrupt presentation controller;
    (d) comparing a best priority found to the least favored priority found for each interrupt presentation controller; and
    (e) saving in the field the least favored priority found if the least favored priority found is less favored.

8. The method of claim 7 wherein the field comprises:
    (a) an interrupt presentation controller number field;
    (b) a search priority field; and
    (c) a best priority field.

9. The method of claim 8 further comprising the steps:
    (f) initializing the interrupt presentation controller number field to a current interrupt presentation controller number;
    (g) initializing the search priority field to a least favored level; and
    (h) initializing the best priority field to a most favored level.

10. The method of claim 7 wherein the least favored priority is a best controller priority.

11. The method of claim 8 wherein the step of searching comprises the steps:

(a) setting the search priority field to the value of the best priority field;

(b) comparing the search priority to a current best controller priority;

(c) assigning the input interrupt message to a first encountered interrupt presentation controller with a current best controller priority that is equal to or less favored than the search priority.

12. The method of claim 11 wherein the step of searching further comprises rejecting the input interrupt message with a priority field that is less favored than the search priority.

13. A method for assigning interrupts among multiple interrupt presentation contollers connected to form a logical loop comprising the steps:

(a) making a first pass through the loop;

(b) recording the best priority found for servicing an interrupt during the first pass;

(c) making a second pass through the loop;

(d) assigning the interrupt to the interrupt presentation controller with a priority equal to or at a less favored level than the best priority found on the first pass;

(e) rejecting the interrupt after the first pass if the best priority found is more favored than a priority of the interrupt;

(f) recording a new best priority found on a subsequent pass; and (g) making a subsequent pass through the loop if no processor is found during a previous pass with a priority which is equal to or less favored than the best priority found on a pass previous to the previous pass.

14. An interrupt presentation controller comprising:

(a) a means for identifying a next interrupt presentation controller in a logical loop;

(b) a means for identifying an interrupt request;

(c) a means for generating a mask (d) a means for determining a processor with the best priority; and (e) a comparator for comparing a best priority recorded to an output of the means for determining a processor with the best priority; and (f) a means for storing a priority of the processor with the best priority if said priority is less favored.

15. The interrupt presentation controller of claim 14 wherein the means for identifying a next interrupt presentation controller in a logical loop is a next interrupt presentation controller number register.

16. The interrupt presentation controller of claim 14 further comprising a current interrupt presentation controller number register.

17. The interrupt presentation controller of claim 14 wherein the means for identifying an interrupt request is an input interrupt message.

18. The interrupt presentation controller of claim 14 wherein the means for generating a mask is a set of logic that uses a queue number contained within the input interrupt message to mask processors controlled by the interrupt presentation controller that are not capable of serving the input interrupt message contained in the input interrupt message register.

19. The interrupt presentation controller of claim 18 wherein the set of logic accesses a queue mask array when the queue number indicates a global queue.

20. The interrupt presentation controller of claim 17 wherein the set of logic generates a null mask in the event that the queue number does not represent either a global queue or a current interrupt presentation controller.

21. The interrupt presentation controller of claim 17 wherein the set of logic generates a mask value indicating which processors are capable of serving the interrupt request.

* * * * *